US012722560B2

(12) United States Patent
Bonfiglioli

(10) Patent No.: US 12,722,560 B2
(45) Date of Patent: Sep. 1, 2026

(54) VARIABLE FOOTPRINT HANDLING APPARATUS FOR HANDLING CONTAINERS

(71) Applicant: ACHA S.R.L., Bologna (IT)

(72) Inventor: Giancarlo Bonfiglioli, Castello d'Argile (IT)

(73) Assignee: ACHA S.R.L., Bologna (IT)

( * ) Notice: Subject to any disclaimer, the term of this patent is extended or adjusted under 35 U.S.C. 154(b) by 351 days.

(21) Appl. No.: 18/557,384

(22) PCT Filed: Mar. 24, 2022

(86) PCT No.: PCT/IB2022/052690
§ 371 (c)(1),
(2) Date: Oct. 26, 2023

(87) PCT Pub. No.: WO2022/229733
PCT Pub. Date: Nov. 3, 2022

(65) Prior Publication Data

US 2024/0208396 A1 Jun. 27, 2024

(30) Foreign Application Priority Data

Apr. 30, 2021 (IT) ........................ 102021000011075

(51) Int. Cl.
*B60P 1/54* (2006.01)
*B60P 3/42* (2006.01)
(Continued)

(52) U.S. Cl.
CPC .................. *B60P 3/42* (2013.01); *B60P 1/54* (2013.01); *B66C 1/101* (2013.01); *B66C 23/42* (2013.01)

(58) Field of Classification Search
CPC ....... B66C 23/42; B66C 19/007; B66C 1/101; B60P 1/54; B60P 3/42
See application file for complete search history.

(56) References Cited

U.S. PATENT DOCUMENTS 3,348,711 A * 10/1967 Gove .................... B60P 1/6445 414/459
3,933,218 A * 1/1976 Oler ......................... B62D 7/08 414/458

(Continued)

FOREIGN PATENT DOCUMENTS

WO 9426554 A1 11/1994
WO WO-9847736 A1 * 10/1998 ............. B62D 13/06
WO 2010048674 A1 5/2010

*Primary Examiner* — Kaitlin S Joerger
(74) *Attorney, Agent, or Firm* — FisherBroyles, LLP; Roger L. Browdy; Ronni S. Jillions

(57) ABSTRACT

A variable footprint handling apparatus (101) for handling containers (105) is described comprising: a first column (155) adapted to be associated with the fifth wheel (130) of a tractor (110), a second column (175) to which a first idle ground support wheel (180) is idly associated, a third column (200) to which a second idle ground support wheel (205) is idly associated, a lifting arrangement (240, 245, 250, 255, 260, 265, 270, 275, 280, 285) for lifting the container (105), and a connection arrangement (220, 230, 235) that connects the second column (175) and the third column (200) to the first column (155) and is configured to move at least one of the three columns with respect to another of the three columns between a first position, and a second position, wherein a footprint in plan of the apparatus in said second position is smaller than a footprint in plan of the apparatus in said first position.

12 Claims, 9 Drawing Sheets

(51) Int. Cl.
*B66C 1/10* (2006.01)
*B66C 23/42* (2006.01)

(56) References Cited

U.S. PATENT DOCUMENTS

| | | | | |
|---|---|---|---|---|
| 2010/0135757 | A1 | 6/2010 | Welch et al. | |
| 2011/0268543 | A1* | 11/2011 | Welch | B60P 1/6445<br>414/812 |

* cited by examiner 110
155
115
220a
125
220
295
240
220b
100
225
235
245
235b
305
235a
210
R2
205
185
200
180
230b
230
175
300
230a
290
240
245
105

FIG.9

VARIABLE FOOTPRINT HANDLING APPARATUS FOR HANDLING CONTAINERS

TECHNICAL FIELD

The present invention relates to a container handling apparatus (ISO) of the variable footprint type, i.e., capable of being arranged in a working configuration in which it allows containers to be lifted and lowered, for example to and from the carriage of an articulated truck, and a storage/transport configuration in which containers cannot be lifted or lowered. In particular, the footprint of the apparatus in the storage/transport configuration is smaller than the footprint in the working configuration, so that the apparatus can be transported on the carriage of a standard articulated truck and on normal roads open to the public.

PRIOR ART

Apparatuses are known for handling containers able to vary their footprint, intended as the set of the maximum height, width and length of the apparatus, in order to switch from a working configuration, in which they can lift/lower and transport by land a container, generally a single container or at most two containers, to a storage or transport configuration, in which the footprint of the apparatus is reduced compared to the working configuration, so that it can for example be transported on the truck of a standard articulated truck circulating on urban roads.

Such apparatuses generally comprise a variable footprint frame, for example comprising telescopic vertical side members and/or uprights, which variable footprint frame rests on the ground by means of at least 3, preferably four wheels, at least one, preferably two, of which are drive wheels in order to be able to move the frame and therewith the container which by means of an apparatus lifting arrangement has been associated with the container.

The apparatus is therefore provided with a motor, to provide the necessary force to the drive wheels to move the apparatus, and a cockpit to allow an operator to drive the apparatus. The motor may be a hydraulic motor that is driven by the fluid placed under pressure by a motor pump connected to the variable footprint frame.

As can be guessed, the motor and the cockpit have considerable footprints which do not match with the need to minimize the footprint of the apparatus in the storage/transport configuration. As can also be guessed that such components complicate and lengthen design/construction times and constitute a significant weight burden.

An object of the present invention is that of solving the aforesaid problems of the apparatuses of the prior art.

Such object is achieved by the features of the invention indicated in the independent claim. The dependent claims outline preferred and/or particularly advantageous aspects of the invention.

DISCLOSURE OF THE INVENTION

In particular, the invention makes available a variable footprint handling apparatus for handling containers comprising:

- a first column adapted to be associated to the fifth wheel of a tractor,
- a second column to which a first idle ground support wheel is idly associated,
- a third column to which a second idle ground support wheel is idly associated,
- a lifting arrangement for lifting the container,
- a connection arrangement that connects the second column and the third column to the first column and is configured to move at least one of the three columns with respect to another of the three columns between a first position, and a second position, wherein a footprint in plan of the apparatus in said second position is smaller than a footprint in plan of the apparatus in said first position.

Thanks to this solution, an apparatus for handling containers, of the type with variable footprint, is made available which is more compact, light, easily transportable and economical, with the same performance, compared to prior art devices. In particular, such advantages are allowed by the fact that the apparatus does not need drive wheels to handle containers, as it can exploit the drive wheels of the tractor provided with fifth wheel (or any other equivalent connection element) to which the first column is adapted to be connected, for example associated in idle mode. Accordingly, since it does not need any drive wheels, it does not need to be provided with motors, generally hydraulic/oleodynamic, used by apparatuses of prior art to rotate the ground support wheels, nor with means for controlling and orienting the drive wheels and for driving the apparatus, since such means are also already included in the tractor. As also set forth below, the apparatus may comprise a pump, driven by an electric motor or endothermic motor, for generating pressurized fluid which allows the connection arrangement to be activated, which, since it does not also have to provide sufficient force to also activate the drive wheels, may be smaller than the apparatuses of prior art, and therefore less bulky. Moreover, it is not excluded that the apparatus may also not comprise an on-board pump to activate the connection arrangement and may be connected to a pump external to the apparatus, thus making it even lighter and more compact. The apparatus is also transportable on the carriage of a standard articulated truck on roads open to the public, as once it is brought into transport configuration does not protrude from the carriage of the articulated truck.

According to an aspect of the invention, designed to improve the compactness of the system when in the transport configuration while maintaining high functionality in the operating configuration, the connection arrangement may be configured to move the third column between a first position, wherein the distance of the third column from the first column is maximum, and a second position, wherein the distance between the third column and the first column is minimum and the third column is at a distance from the first column that is less than the distance of the second column from the first column.

According to another aspect of the invention, the connection arrangement may comprise:

- a first crosspiece provided with a first end rigidly fixed to the first column and a second end to which the second column is hinged with respect to a vertical axis of rotation,
- a second crosspiece provided with a first end rigidly fixed to the second column and a second end rigidly fixed to the third column,
- an actuator configured to move the third column in rotation with respect to said axis of rotation.

Still another aspect of the invention provides that the actuator may be a linear actuator provided with a first end hinged to one between the first column and the first crosspiece and an opposite second end hinged to one between the third column and the second crosspiece.

Still another aspect of the invention provides that the third column and the second column may be of a telescopic type.

In this way it is possible, for the same footprint in the operating configuration, to reduce the footprint in the transport configuration.

Another aspect of the invention according to which the first column and the first crosspiece can be of the telescopic type may contribute to improve this advantage.

In addition, this feature allows the column to be lifted to a point where the first crosspiece and the second crosspiece are above the tractor, thus allowing the apparatus to be brought in front of the tractor for better maneuverability, and at the same time allowing the apparatus to be loaded onto the carriage.

According to an aspect of the invention, the lifting arrangement may be provided with a first portion connected to the second column and a second portion connected to the third column.

According to a further aspect of the invention, the first portion and the second portion of the lifting arrangement may each comprise:

- a pair of arms, of which a first arm and a second arm are hinged to the respective column with respect to a corresponding vertical hinge axis and which develop along respective longitudinal directions transverse to the corresponding hinge axis,
- a first container gripping body integral with a first rope at least partially wrapped around a first wheel hinged to the first arm and operated by means of a first actuator,
- a second container gripping body integral with a second rope at least partially wrapped around a second wheel hinged to the first arm and operated by means of a second actuator.

A first spacer bar and a second spacer bar removably associable to respective arms facing each other, so as to prevent rotation of said arms with respect to the hinge axes.

In this way it is possible to easily position the apparatus in the operating configuration and provide rigidity to the system without increasing its overall dimensions, in particular when it is in the transport configuration.

In an alternative embodiment not illustrated and less preferred, in order to keep the arms fixed in position by preventing them from rotating with respect to the respective hinge axes, a locking system configured to act directly on the hinge itself could be provided.

According to another aspect of the invention, the apparatus may comprise a pump driven by a motor and operatively connected to the connection arrangement for moving the first column between the first and second position and wherein said pump and said motor are connected to one of the three columns or the connection arrangement.

The invention also makes available a system for handling containers comprising a tractor, provided with a fifth wheel, and an apparatus according to claim 1, wherein the first column is removably connected to the fifth wheel of the tractor.

BRIEF DESCRIPTION OF THE DRAWINGS

Further characteristics and advantages of the invention will become clear from reading the following description provided by way of non-limiting example, with the aid of the figures illustrated in the accompanying tables.

FIG. 9 is a schematic plan view of the system of the preceding figures in which the tractor is placed laterally to the apparatus and container.

BEST MODE OF THE INVENTION

Figure 1:
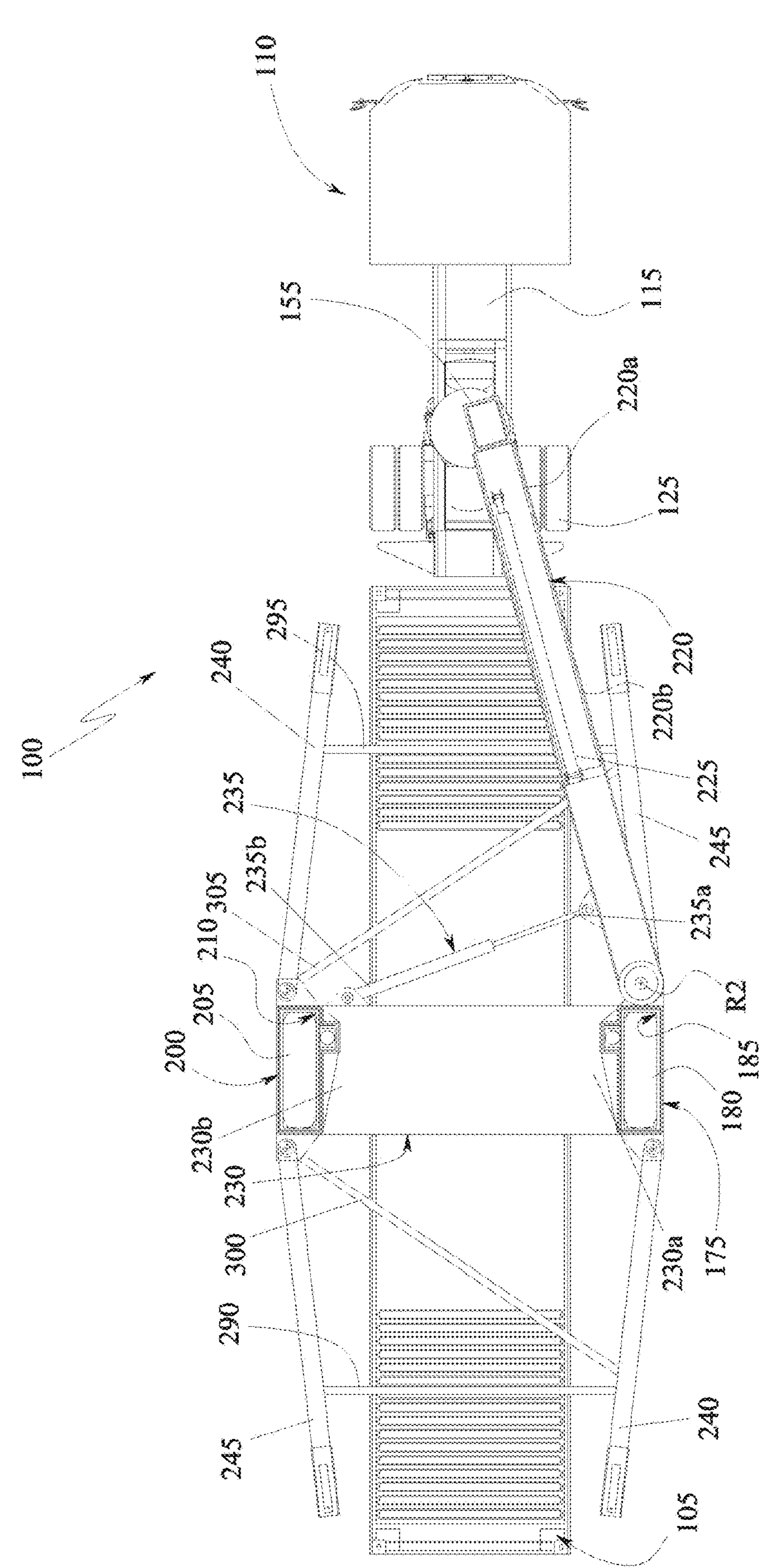
FIG. 1 is a schematic plan view of a container handling system according to the invention, comprising a container handling apparatus according to the invention, illustrated in a step of handling a container by land.
Figure 2:
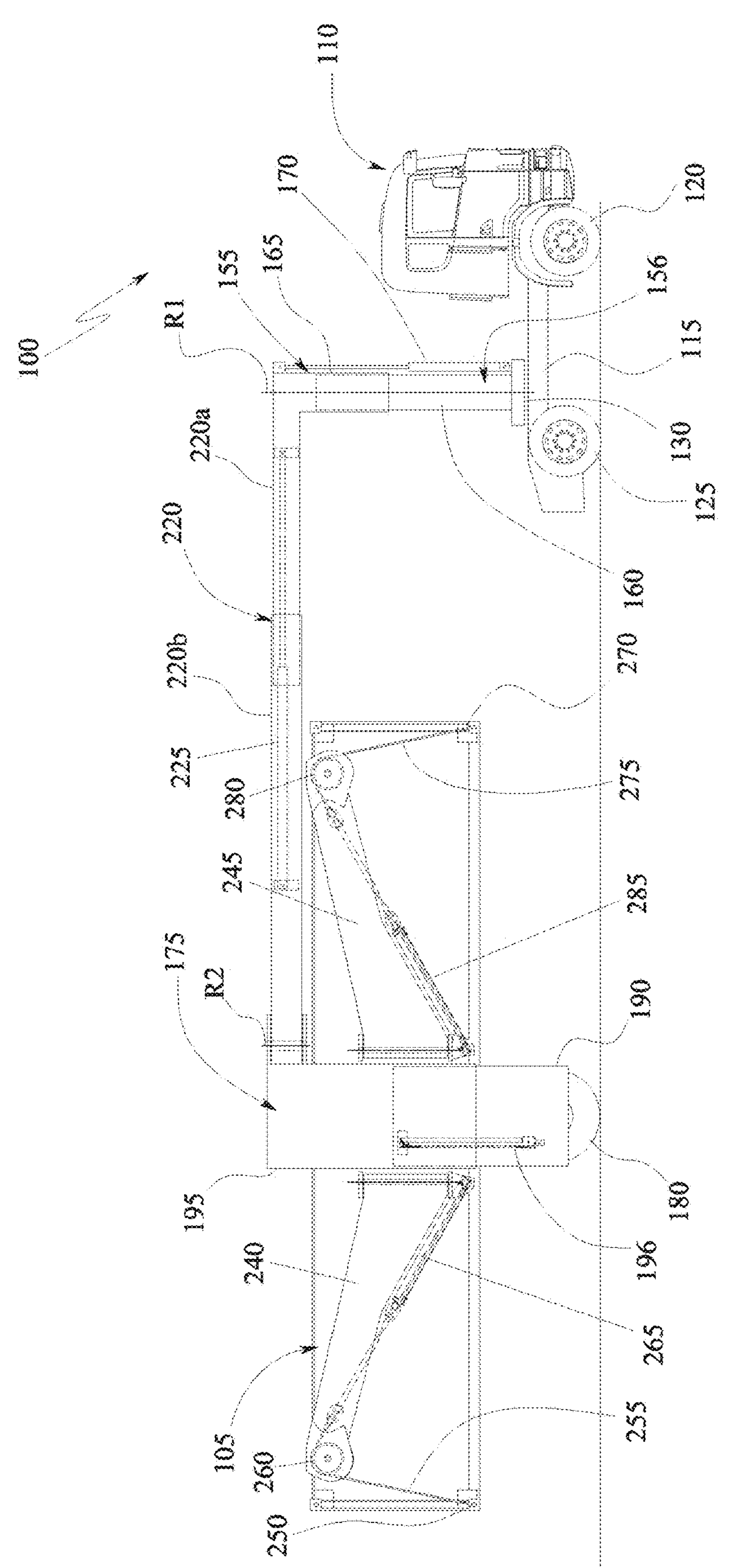
FIG. 2 is a schematic side view of the system of FIG. 1.

With particular reference to such figures, a system for handling containers 105 (ISO containers), in particular of the type capable of moving autonomously along roads and highways open to the public, has been globally indicated with 100. In the illustrated embodiments, there is a system 100 capable of handling a single container, however, with appropriate dimensional modifications of the system well within the reach of the person skilled in the art, the inventive concept underlying the system can be adapted to transport two containers stacked vertically one on top of the other.

The container 105 that can be handled by the system is preferably an ISO container (provided with coupling elements, for example in the form of pins and/or slots), adapted to be grasped by the system 100, for example by means of hooks.

The system 100 comprises a tractor 110, i.e., a self-propelled vehicle suitable for land transportation, which comprises a chassis 115 to which at least one pair of drive and steering wheels 120 or one pair of drive wheels and one pair of steering wheels (and possibly, generally, also at least one pair of idle wheels 125) are associated.

The tractor illustrated is that of an articulated vehicle, i.e., a self-propelled vehicle adapted to transport carriages resting on the ground by means of idle wheels, however it is not excluded that the tractor may be another self-propelled vehicle, such as a forklift.

It is specified that a carriage is defined as a frame having a flat upper surface for supporting goods, for example a container, and to which a plurality of ground support wheels, all of which are idle wheels, is associated. In practice, the carriage needs a tractor to be moved.

The tractor 110 comprises a motor (not illustrated), for generating the force necessary for the drive wheels to move the tractor, and a transmission (in the case where the motor is endothermic) for carrying the energy of the motor to the drive wheels.

The tractor 110 further comprises a steering system (not illustrated), for controlling the steering wheels or the steering and drive wheels, and a cockpit adapted to accommodate a tractor operator and controls for operating said tractor systems.

The tractor 110 comprises a fifth wheel 130 (internationally known) associated with the frame of the tractor and which is adapted to allow the removable connection of a carriage to be towed and which inferiorly supports a portion of said carriage.

Specifically, the fifth wheel 130 comprises a plate, provided with a substantially flat upper surface 135 (which is generally lubricated to reduce friction with the portion of the carriage placed on top of it), in which plate a recess 140 adapted to allow the insertion of a pin of the carriage, is made.

The fifth wheel then comprises a locking mechanism configured to selectively retain and release a pin (of the carriage) inserted inside the recess.

The cockpit is positioned in a front portion of the tractor, while the fifth wheel 130 is positioned in a rear portion of the tractor.

The system 100 further comprises a variable footprint handling apparatus 101 (hereinafter abbreviated as apparatus 101) for handling containers 105. In particular, the handling performed by the apparatus involves lifting, lowering and keeping the container suspended from the ground. By connecting the apparatus to the tractor 110, as will become clearer in the following, it then becomes possible to handle the container by moving it horizontally in space while the apparatus keeps the container suspended in the air.

The apparatus 101 is a variable footprint apparatus as it is able to vary its footprint between a working (or operating) configuration, in which it is possible to lift/lower and keep lifted a container (or a pair of containers) and a storage or transport configuration, in which the maximum overall footprint of the apparatus 101 is reduced compared to the working configuration.

It is specified that variable footprint means the possibility of varying at least one of its dimensions in the space between height, width and length. Width and length are perpendicular to each other and lie on a horizontal plane, whereas the height is measured vertically. Further, in this discussion, width will be used with reference to a measurement direction perpendicular to a straightforward direction of the tractor, in a condition where the apparatus 101 is connected to and aligned with the tractor (as is visible in the figures), and the length with reference to a measurement direction parallel to the straightforward direction of the tractor and perpendicular to the length.

The maximum overall footprint may be considered as the volume of the smallest parallelepiped that entirely contains the apparatus 101.

The apparatus 101 comprises a variable footprint frame, also definable as "with variable geometry", adapted to be removably connected to the tractor 110, namely to the fifth wheel 130 of the tractor, to be moved by it.

In the illustrated embodiment, the frame is capable of varying its footprint in all three indicated directions (height, width and length). However, it is not excluded that in a non-illustrated, and less preferred embodiment, the frame is capable of varying its footprint only in the direction of its width or in the direction of width and length, but not in height. The variation in frame footprint allows the apparatus 101 to be operated between the operating configuration, in which it is capable of handling a container, i.e., lifting, lowering and keeping it suspended, and the transport or storage configuration, in which the apparatus 101 is adapted to be transported on the carriage of an articulated truck, i.e., a carriage connected to a tractor. In the transport configuration, the apparatus 101 is not configured to handle a container.

In the operating configuration the footprint of the frame (and of the apparatus 101) is maximum, while it is minimum in the transport or storage configuration.

Said variable footprint frame comprises a first column 155, which is vertical, i.e., it develops mainly longitudinally along a vertical axis, and is adapted to be removably connected to the tractor. In particular, the apparatus 101 is connected to the tractor only through the first column.

The first column 155 is adapted to be associated, i.e., is associated, idly with the fifth wheel 130 of the tractor so that the first column can rotate with respect to the tractor with respect to a vertical axis of rotation R1. Alternatively, the column may comprise a rigidly fixable lower portion, i.e., rigidly fixable without residual degrees of freedom, to the fifth wheel 130 and the remainder of the first column is rotatably associated with respect to said lower end with respect to the vertical axis of rotation R1.

For the connection to the fifth wheel, the first column comprises a coupling arrangement located at a lower end 156 of the first column.

Such a coupling arrangement may, for example, be the one known to a person skilled in the art for fixing a carriage to the fifth wheel of the tractor and may comprise a pin (not illustrated) adapted to be inserted into the recess 140 of the fifth wheel 130. Obviously, it cannot be excluded that, as an alternative to the fifth wheel, the tractor could comprise a system for the ad hoc connection of the first column. In such a case, the tractor could, for example, comprise a vertical pin on which a lower portion of the first column is fitted so as to realize a toroidal pair with a vertical axis of rotation R1.

In the illustrated embodiment, the first column is of a telescopic type and capable of varying its longitudinal extension along a vertical direction.

Thus, the first column comprises a lower section 160 that comprises the lower portion of the first column and an upper section 165 that is movable with respect to the lower section along a vertical direction, such as by means of a linear actuator 170.

The variable footprint frame then comprises a second column 175 (vertical, i.e., developing longitudinally along a vertical axis) to which a first idle ground support wheel 180 is associated idly. In practice, the second column rests on the ground (only) by means of the first idle wheel which is connected to a lower end of the second column.

The first idle wheel 180 is rotatably associated with the second column 175 at least with respect to a horizontal axis of rotation. It is not excluded that the first idle wheel 180 may be rotatably associated idly with the second column 175 also with respect to a vertical axis of rotation, for example coaxial to a longitudinal axis of the column.

The first idle wheel 180 may be, at least partially, vertically aligned with the second column. Preferably, the second column entirely overlaps in plan the first idle wheel.

In the illustrated embodiment, in order to further reduce the footprints, the second column comprises a cavity 185 within which the first idle wheel 180 is at least partially contained.

For example, the second column could also comprise a drive configured to selectively let the first idle wheel protrude from the cavity (so that at least one-third of the wheel protrudes) and to let it retract into the cavity (so that less than one-quarter of the wheel protrudes from the cavity), so as to allow a further reduction in footprints and at the same time allow obstacles to be overcome when the wheel is caused to protrude.

It is not excluded that the second column may comprise more than one ground support wheel idly hinged to the second column.

In the embodiment illustrated, the second column is of a telescopic type and capable of varying its longitudinal extension along a vertical direction. In particular, the second column may comprise a lower section 190 to which the first idle wheel 180 is directly associated in the manner described above, and an upper section 195 movable with respect to the lower section along a vertical axis. For example, the actuation of the second section may be through the linear actuator 196 shown in the figures.

The second column 175 is distinct and spaced by a non-zero amount from the first column.

The variable footprint frame also comprises a third column 200 (vertical, i.e., developing longitudinally along a vertical axis) to which a second idle ground support wheel 205 is associated idly. In practice, the third column rests on the ground (only) by means of the second idle wheel which is connected to a lower end of the third column.

The second idle wheel 205 is rotatably associated with the third column 200 at least with respect to a horizontal axis of rotation. It is not excluded that the second idle wheel 205 may be rotatably associated idly with the third column 200 also with respect to a vertical axis of rotation, for example coaxial to a longitudinal axis of the column.

The second idle wheel 205 may be, at least partially, vertically aligned with the third column. Preferably, the third column entirely overlaps in plan the second idle wheel.

In the illustrated embodiment, in order to further reduce the footprints, the third column comprises a cavity 210 within which the second idle wheel 205 is at least partially contained.

For example, the third column could also comprise a drive configured to let the second idle wheel protrude from the cavity (so that at least one-third of the wheel protrudes) and to let it retract into the cavity (so that less than one-quarter of the wheel protrudes from the cavity), so as to allow a further reduction in footprints and at the same time allow obstacles to be overcome when the wheel is caused to protrude.

It is not excluded that the third column may comprise more than one ground support wheel hinged idly to the third column.

In the embodiment illustrated, the third column is of a telescopic type and capable of varying its longitudinal extension along a vertical direction. In particular, the third column may comprise a lower section 200*a* to which the second idle wheel 205 is directly associated in the manner described above, and an upper section 200*b* movable with respect to the lower section along a vertical axis. For example, the actuation of the second section may be through the linear actuator 215 shown in the figures.

The third column 200 is distinct and spaced by a non-zero amount from both the first column 155 and the second column 175.

Preferably, the variable footprint frame does not comprise any other support columns other than the first column, the second column and the third column. In other words, the weight of the apparatus 101, and of any container associated therewith, is discharged towards the ground passing only through the first column, the second column and the third column.

Additionally, the apparatus 101, when in use, only touches the ground through the first idle wheel, the second idle wheel, and the tractor when the apparatus 101 is connected to the tractor (alternatively, the apparatus 101 may be momentarily supported by a stand and/or a variable extension support foot).

The variable footprint frame comprises a connection arrangement connecting the second column 175 and the third column 200 to the first column 155 and is configured, for example thanks to actuators and linkages and/or joints, to move at least one of the three columns with respect to another of the three columns between a first position (in which the apparatus 101 has a predetermined footprint in plan), e.g., wherein the footprint in plan of the apparatus 101, i.e., of the variable footprint frame, is maximum, and a second position, wherein the footprint in plan of the apparatus 101, i.e., of the variable footprint frame, in said second position is smaller than the footprint in plan of the apparatus 101 in said first position.

It should be noted that the footprint in plan is the width and length of the frame from a plan viewpoint. Alternatively, this footprint in plan can be understood as the area of a triangle lying on a horizontal plane and the vertices thereof are positioned in the respective columns.

The first position of the connection arrangement is the one that must be assumed to achieve the operating configuration of the apparatus 101 in which it allows to transport a container, while the second position must be assumed to achieve the transport configuration of the apparatus 101.

In the first position, the container to be lifted, or lowered, or which is kept lifted by the apparatus 101, is interposed (directly) between the first column, the second column and the third column.

The direction in which to measure the width of the apparatus 101 may also be defined as the direction of the horizontal distance between the second column 175 and the third column 200 when the connection arrangement is in the first position.

In the illustrated embodiment, the connection arrangement is configured to move the third column 200 (with respect to the second column 175 and the first column 155) between a first position, wherein the distance (horizontal and minimum) of the third column 200 from the first column 155 is maximum, and a second position, wherein the distance (horizontal and minimum) between the third column and the first column is minimum, and the third column is at a shorter distance from the first column than the distance of the second column from the first column.

For example, in such second position, the third column is interposed between the first column and the second column.

When passing from one position to another, only the third column is moved with respect to the two, which always remain at a predetermined distance from each other.

In practice, the connection arrangement is configured to bring the third column and the first column closer to and further away from each other, for example by placing at least one of them in rotation with respect to a vertical axis of rotation.

In the first position, the distance of the third column from the first column is approximately equal to the distance of the second column from the first column, i.e., the distance of the third column from the first column is comprised between + and −20% of the distance of the second column from the first column. In the illustrated embodiment, in the first position the distance of the third column from the first column is equal to the distance of the second column from the first column.

Further, in the first position, the second column and the third column are aligned along a direction perpendicular to a vertical centreline plane of the apparatus 101 passing the first column (said centreline plane being detectable when the connection arrangement is in the first position). This centreline plane also divides the container into two when it is handled by the apparatus 101.

In a preferred embodiment of the connection arrangement illustrated in the figures, the connection arrangement comprises a first crosspiece 220, for example with a straight course, which is provided with a first end 220*a* rigidly fixed (without residual degrees of freedom) to the first column 155, i.e., to a top portion (of the upper section) of the first column 155, and an opposite second end 220*b* to which the second column 175, i.e., to a top portion (of the upper section) of the second column 175, is hinged with respect to a vertical axis of rotation R2.

For example, the first crosspiece is arranged horizontally.

The first crosspiece 220 is preferably telescopic so as to be able to vary a horizontal distance between its first end 220*a* and its second end 220*b*. This makes it possible to vary the horizontal distance between the first column 155 and the second column 175 and thus improve the compactness of the variable footprint frame.

Thus, the first crosspiece may comprise a first section comprising the first end 220*a* and a second section comprising the second end 220*b* that is movable with respect to the first section along a straight axis by means of a linear actuator 225.

The first crosspiece comprises only said ends and is directly connected only to the first column and to the second column.

In said illustrated embodiment, the connection arrangement also comprises a second crosspiece 230 provided with a first end 230*a* rigidly fixed (without residual degrees of freedom) to the second column 175, that is, to the top portion (of the upper section) of the second column 175, and an opposite second end 230*b* rigidly fixed (without residual degrees of freedom) to the third column 200, that is, to a top portion (of the upper section) of the third column 200.

The second crosspiece comprises only said ends and is directly connected only to the third column and the second column.

For example, the second crosspiece is arranged horizontally.

In the embodiment illustrated in FIGS. 1-7, the second crosspiece is preferably inextensible.

Figure 8:
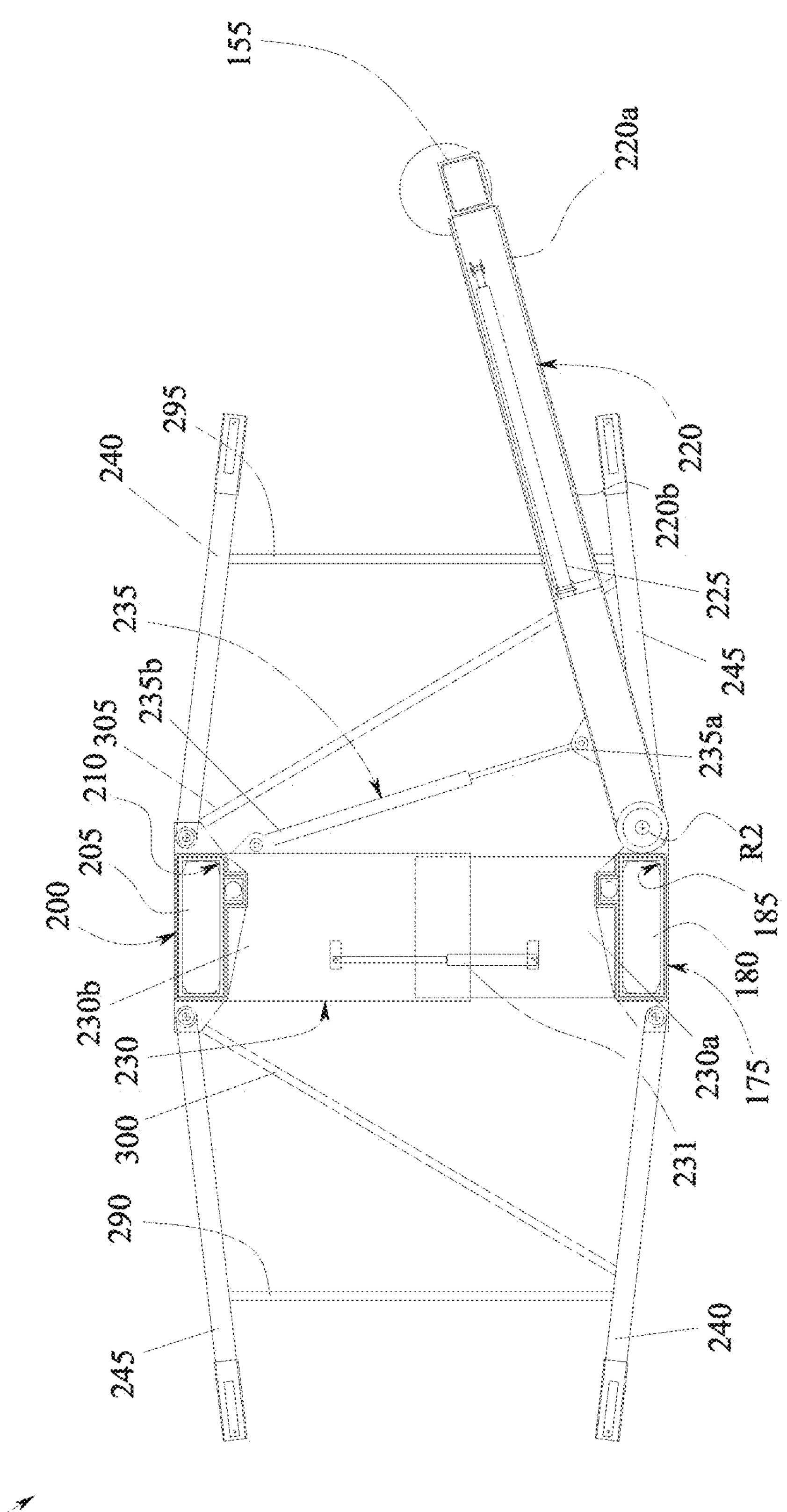
FIG. 8 is a schematic plan view of an alternative embodiment of the apparatus of the preceding figures in which the second crosspiece is telescopic.

In the embodiment of the apparatus illustrated in FIG. 8, however, the second crosspiece is telescopic so that a horizontal distance can be varied between its first end and its second end. In such a case, as illustrated in FIG. 8, the second crosspiece also comprises a linear actuator 231 configured to vary said horizontal distance between the aforesaid first and second end.

The first and the second crosspiece are placed at such a vertical height that they are entirely above the handled container, without interfering with it.

The connection arrangement further comprises an actuator 235 configured to move the third column in rotation with respect to said axis of rotation R2 and with respect to the first crosspiece, that is to move the second crosspiece 230, to which the third column is rigidly fixed, with respect to the axis of rotation R2 and with respect to the first crosspiece.

The rotation of the third column with respect to the axis of rotation R2 by means of the actuator 235 allows the connection arrangement to be operated between the first position and the second position of the connection arrangement.

Figure 9:
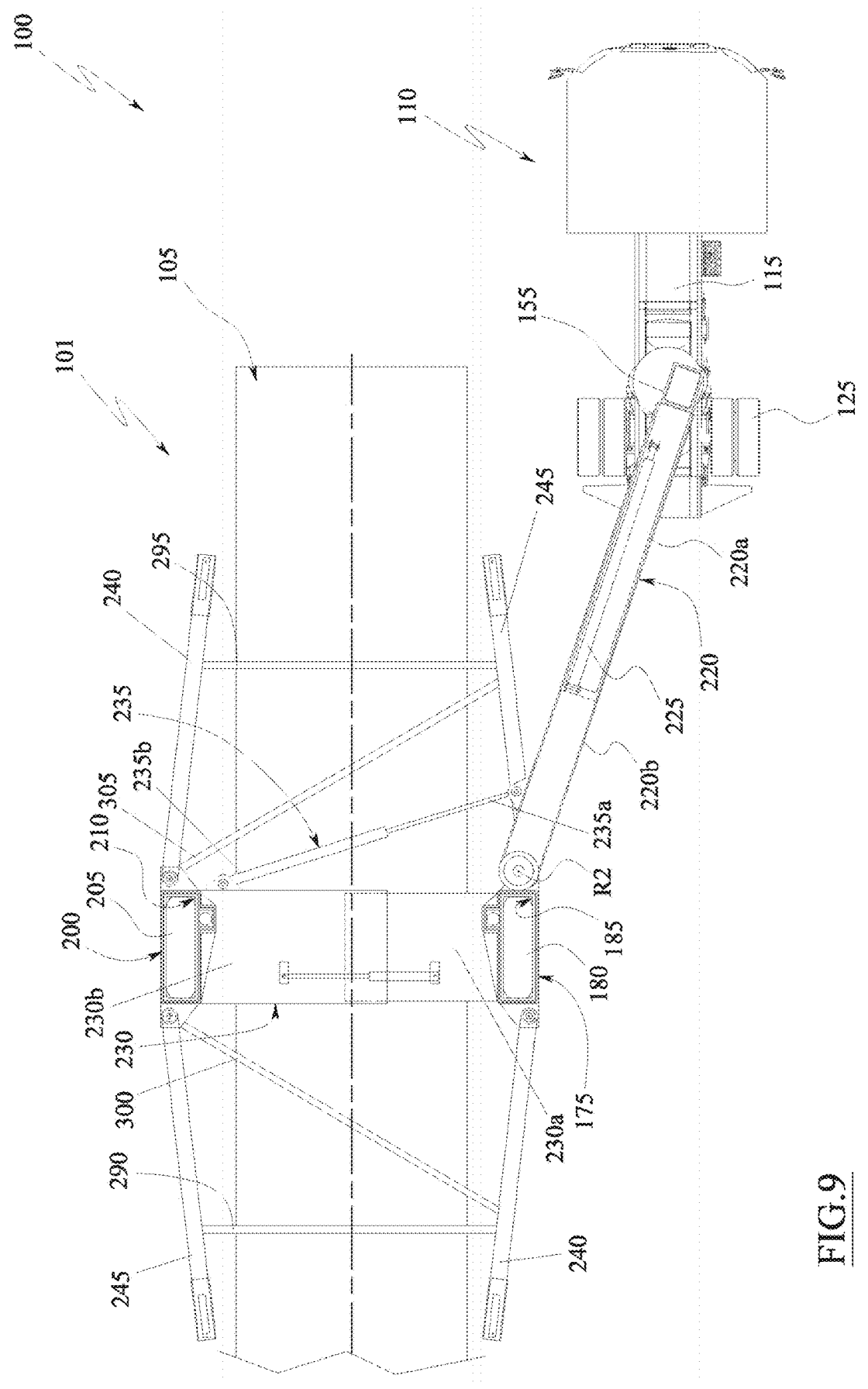

Said rotation of the third column with respect to the axis of rotation R2, if combined with a rotation of the first column about its axis of rotation R1, further makes it possible to arrange the tractor 110 laterally with respect to the apparatus 101 and therefore alongside the container 105, as illustrated in FIG. 9.

The system can therefore be used to lift and handle loads that are longer than an ISO container, for example even longer than the system itself, by positioning the second crosspiece perpendicular to a longitudinal axis of the load and the tractor placed in plan alongside the load, making it move forward or backward along a trajectory parallel to the longitudinal axis of the load.

For example, the actuator 235 is a linear actuator provided with a first end 235*a* hinged to one between the first column 155 and the first crosspiece 220 and an opposite second end 235*b* hinged to one between the third column 200 and the second crosspiece 230.

The actuator comprises a first portion provided with the first end and a second portion provided with the second end and movable with respect to the first portion along a straight axis. Such a straight axis preferably lies on a horizontal axis.

Specifically, in the embodiment illustrated in FIG. 1, the first end 235*a* is hinged to the first crosspiece and the second end 235*b* is hinged to the second crosspiece.

The actuator is preferably of the oleopneumatic type.

For example, the first and second crosspiece may be straight.

In the second position, the first and second crosspiece have longitudinal axes incident to each other, and in the second position, the first and second crosspiece have longitudinal axes substantially parallel to each other.

In an alternative, less preferred embodiment of the connection arrangement, the third column could be connected directly with a telescopic crosspiece to the first column and the second column could be connected with a rigid crosspiece, not variable in length, to the first column.

The variable footprint frame is rigid, i.e., not deformable under normal working loads. In other words, the columns and the crosspieces of the variable footprint frame are rigid.

Connected to the variable footprint frame is a lifting arrangement for lifting the container (with respect to the ground, i.e., with respect to a vertical height of the wheels), i.e., configured to allow the container to be lifted, kept lifted and lowered.

Said lifting arrangement is provided with a first portion (directly) connected to the second column and a second portion (directly) connected to the third column.

Each of said portions is provided with a coupling element, or lower container support, operable at least along a vertical direction for lifting, keeping lifted and lowering, the container.

In the illustrated embodiment, both the first portion and the second portion of the lifting arrangement each comprise a pair of arms, wherein a first arm 240 and a second arm 245 are hinged to the respective column, preferably idly, with respect to a corresponding vertical hinge axis (different for the two arms) and develop along respective longitudinal directions transverse to the corresponding hinge axis, for example horizontally in a direction away from the respective column.

Each portion of the lifting arrangement comprises a first gripping body 250, i.e., a first coupling body, of the container and a first actuation arrangement of said first gripping body configured to move it vertically.

In the illustrated embodiment, the first actuation arrangement comprises a first rope 255 at least partially wrapped to a first (idle) wheel 260 hinged to the first arm 240 and operated by means of a first actuator 265, for example a linear actuator, to which first rope the first gripping body is associated.

The first gripping body may for example be a hook.

Each portion of the lifting arrangement also comprises a second gripping body 270, i.e., a second coupling body, of the container and a second actuation arrangement of said second gripping body configured to move it vertically.

In the illustrated embodiment, the second actuation arrangement comprises a second rope 275 at least partially wrapped to a second (idle) wheel 280 hinged to the second arm 245 and operated by means of a second actuator 285, for example a linear actuator, to which second rope the second gripping body is associated.

It is not excluded that in an alternative embodiment, the actuation arrangements may comprise linear actuators provided with one end associated (e.g., rigidly or hinged) with the respective arm and an opposite end to which the respective gripping body is connected (e.g., rigidly or hinged). In such an embodiment, the gripping body could be a fork of the type used in forklifts, or a hook.

In a non-illustrated embodiment, the lifting arrangement may comprise at least two pairs of forks, wherein one pair is rigidly connected to the upper section of the second column and the other pair is rigidly connected to the upper section of the third column. In this way by means of the telescopic columns it is possible to lift a container while pushing it from below, after having inserted the forks underneath the container.

The illustrated lifting arrangement comprises a first spacer bar 290 and a second spacer bar 295 removably associable with respective arms facing each other of the lifting arrangement, so as to prevent rotation of said arms with respect to the hinge axes.

In particular, the first spacer bar has a first end connected to the first arm of the first portion of the lifting arrangement and an opposite second end connected to the second arm of the second portion of the lifting arrangement and is directly interposed between them.

The spacer bars are rigid, i.e., not deformable under normal working loads to which they are subjected. In particular, these bars only work in traction and compression under forces applied to them by the arms between which they are interposed.

The lifting arrangement may comprise, in addition to the first and second spacer bar, a third spacer bar 300 and a fourth spacer bar 305 that extend from one between the second column and the third column toward the arms of the portion of lifting arrangement associated with the opposite column.

The apparatus 101 may comprise a pump (not illustrated) driven by a motor (not illustrated) and operatively connected to the connection arrangement for moving the first column between the first and the second position, i.e., for powering the actuator of the connection arrangement.

As can be guessed, such a pump can also be used to power other actuators that may be present when certain elements are telescopic, such as the columns, for example.

These pumps and motor are smaller in size than those of the prior art devices, as they need to power only the drives of the variable geometric frame and do not need to also drive the wheels to move the frame.

Said pump and said motor are connected to one of the three columns or to the connection arrangement.

The operating configuration of the apparatus 101, i.e., of the variable footprint frame, occurs when the connection arrangement is in the first position and all the telescopic columns are in one of their position of maximum longitudinal extension.

In the illustrated embodiment, the operating configuration occurs when the connection arrangement is in the first position, all telescopic columns are in their position of maximum longitudinal extension, the idle wheels protrude at least one-third from the cavity and the spacer bars are interposed between the arms of the lifting arrangement.

The operating configuration coincides with when the connection arrangement is in the first position only in the less preferred embodiment in which the columns are not telescopic, the wheels are not within cavities made in the columns and are movable with respect to said cavities, and the lifting arrangement comprises forks that are vertically movable along the columns instead of hinged arms.

The transport configuration of the apparatus 101, i.e., the variable footprint frame, occurs when the connection arrangement is in its second position and all the telescopic columns are in one of their position of minimum longitudinal extension.

In the illustrated embodiment, the transport configuration occurs when the connection arrangement is in the second position, all telescopic columns are in their position of minimum longitudinal extension, the idle wheels protrude less than a quarter from the cavity, the first crosspiece is in its position of minimum longitudinal extension, and the spacer bars are not interposed between the arms of the lifting arrangement.

The transport configuration coincides with when the connection arrangement is in the second position only in the less preferred embodiment in which the columns are not telescopic, the first crosspiece is not telescopic, the wheels are not within cavities made in the columns and are movable with respect to said cavities, and the lifting arrangement comprises forks that are vertically movable along the columns.

The apparatus 101 illustrated can be connected to any tractor, i.e., a tractor of an articulated truck, provided it has a fifth wheel. Alternatively, it is possible to assume the use of a special tractor, provided with the fifth wheel (or alternatively with an arrangement for fixing the apparatus comprising a pin or a circular seat that allow to removably associate the apparatus 101 to the special tractor, forming a toroidal pair with a vertical axis of rotation with the first column of the apparatus 101. For example, such a tractor could be an adapted forklift or other self-propelled industrial vehicle.

The system, in order to facilitate loading the apparatus onto the carriage to allow it to be transported when the apparatus is in a transport configuration, may comprise a stand 211 having a pair of horizontal, telescopic upper crosspieces that are positioned side-by-side and parallel to each other and are configured to extend and retract while the connection arrangement is operated between the first and the second position by inferiorly supporting the first and the second crosspiece and following them in the movement leading to the passage between the second and the first position.

The operation of the system according to the invention is as follows.

Figure 4:
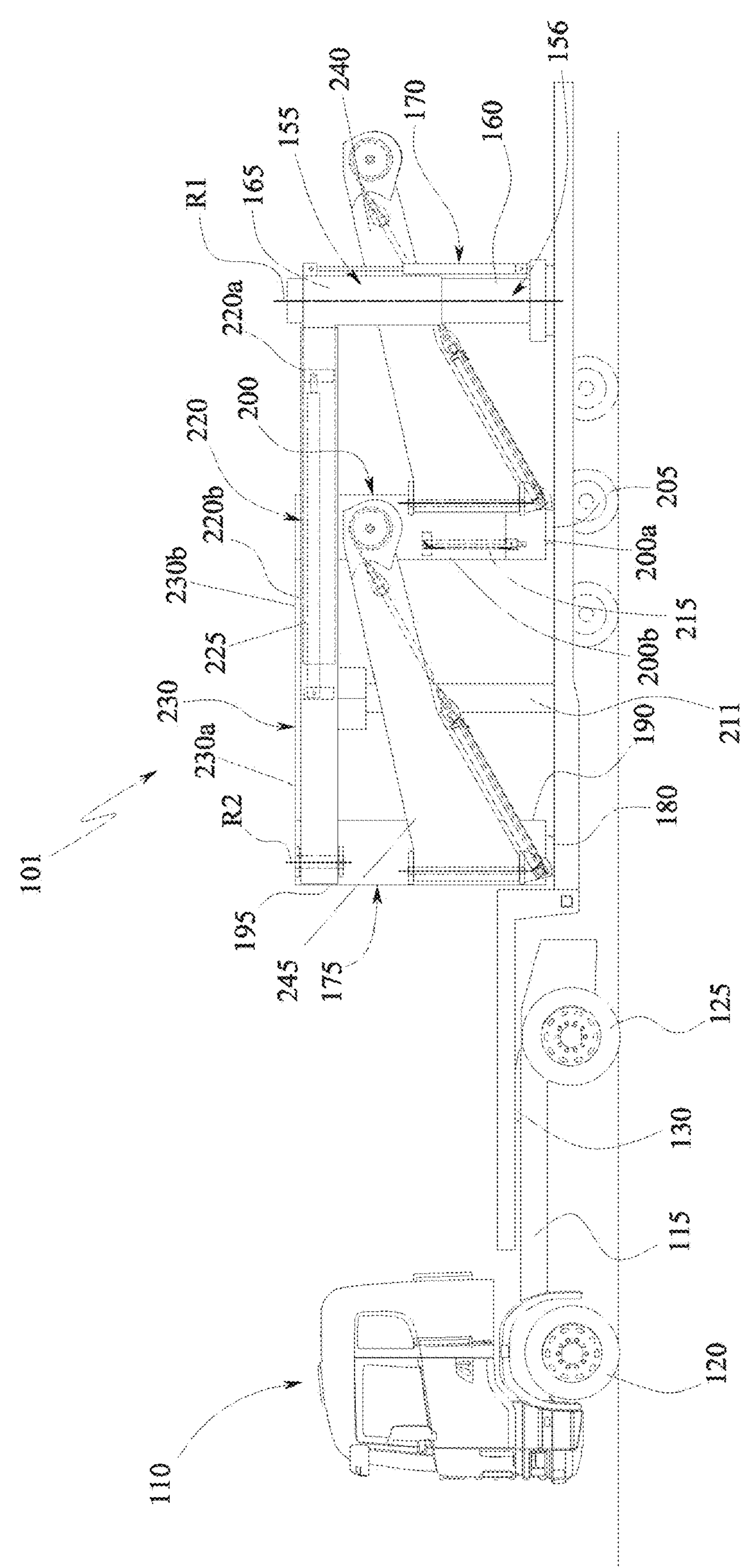
FIG. 4 is a schematic side view of the container handling apparatus of the preceding figures, illustrated in a transport configuration while being transported on the carriage of an articulated truck.
Figure 5:
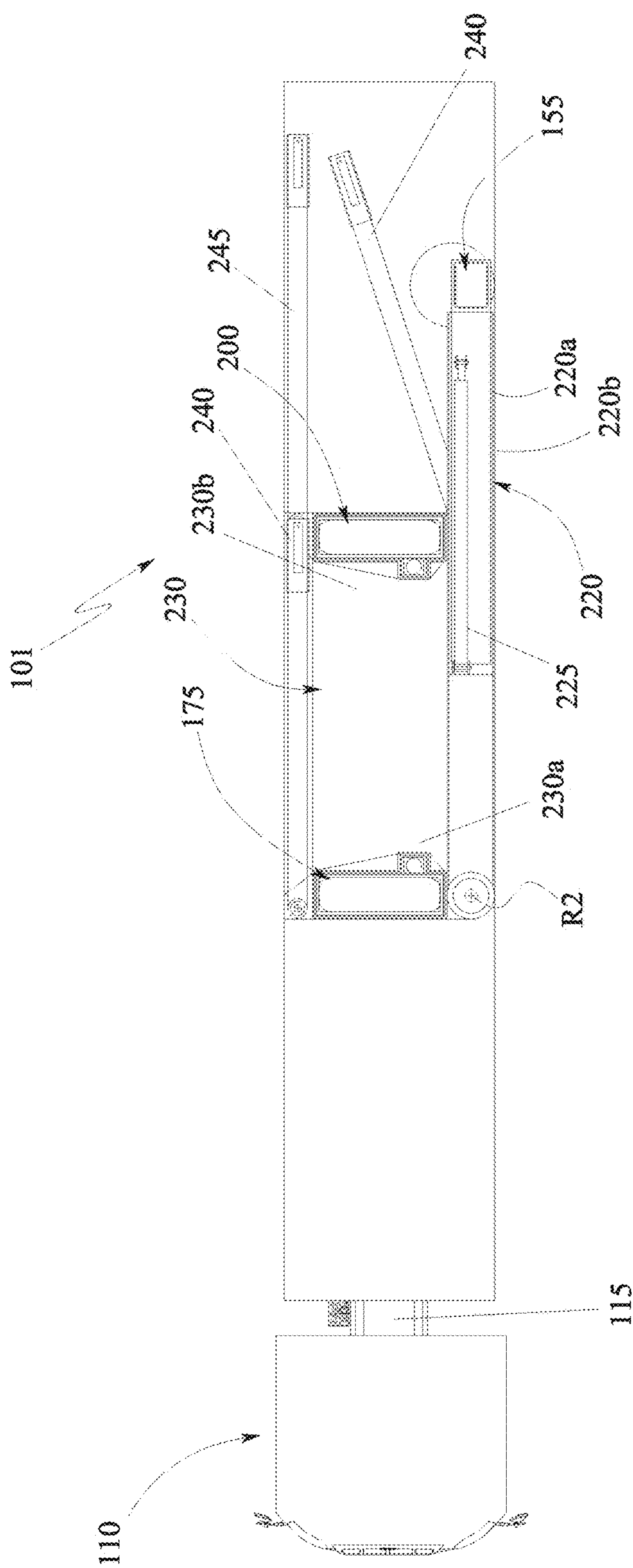
FIG. 5 is a schematic plan view of what is illustrated in FIG. 4.

The apparatus 101 is transported in a transport configuration positioned above a carriage pulled by a tractor that takes it where it is supposed to be used to handle containers (see FIGS. 4 and 5).

Once they have reached destination, the apparatus 101 is brought from the transport configuration into the operating configuration supporting it during this transition, for example by placing it on the special stands, such as for example the stand 211 or by means of a forklift or by lifting it by means of a crane.

First of all, in the passage from the transport configuration to the operating configuration, the drive of the connection arrangement that places the second crosspiece 230 in rotation with respect to the vertical axis of rotation R2 is operated in order to bring it from the second position into the first position. After that, the first column 155 can already be connected to the fifth wheel 130 of the tractor.

If the columns are telescopic, like the one illustrated, the columns and possibly also the first crosspiece are extended.

Also in the illustrated case, in which the lifting arrangement comprises the arms 240, 245, from the position visible in plan in FIG. 5, they are to be rotated with respect to the respective hinge axes so that in each pair of arms they both protrude in diametrically opposite directions away from the respective column to which they are hinged. These directions are substantially parallel to the forward direction of the system when the apparatus 101 is connected to the tractor, that is parallel to the median plane of the apparatus 101 when it is in the first position. Further, after positioning the arms, they are locked in place by means of the spacer bars 290, 295, 300, 305 which are fixed to them.

Once the apparatus 101 is in operating configuration and connected to the tractor, the apparatus 101 is moved by the tractor at the container to be lifted, positioning it so that the container is between the first column, the second column and the third column.

In the illustrated embodiment, the container is also interposed in plan between the arms of the first portion of the lifting arrangement and the arms of the second portion of the lifting arrangement.

At this point, the container is grasped by the gripping bodies of the lifting arrangement and lifted so that it does not touch the ground or the carriage on which the container is placed.

Figure 3:
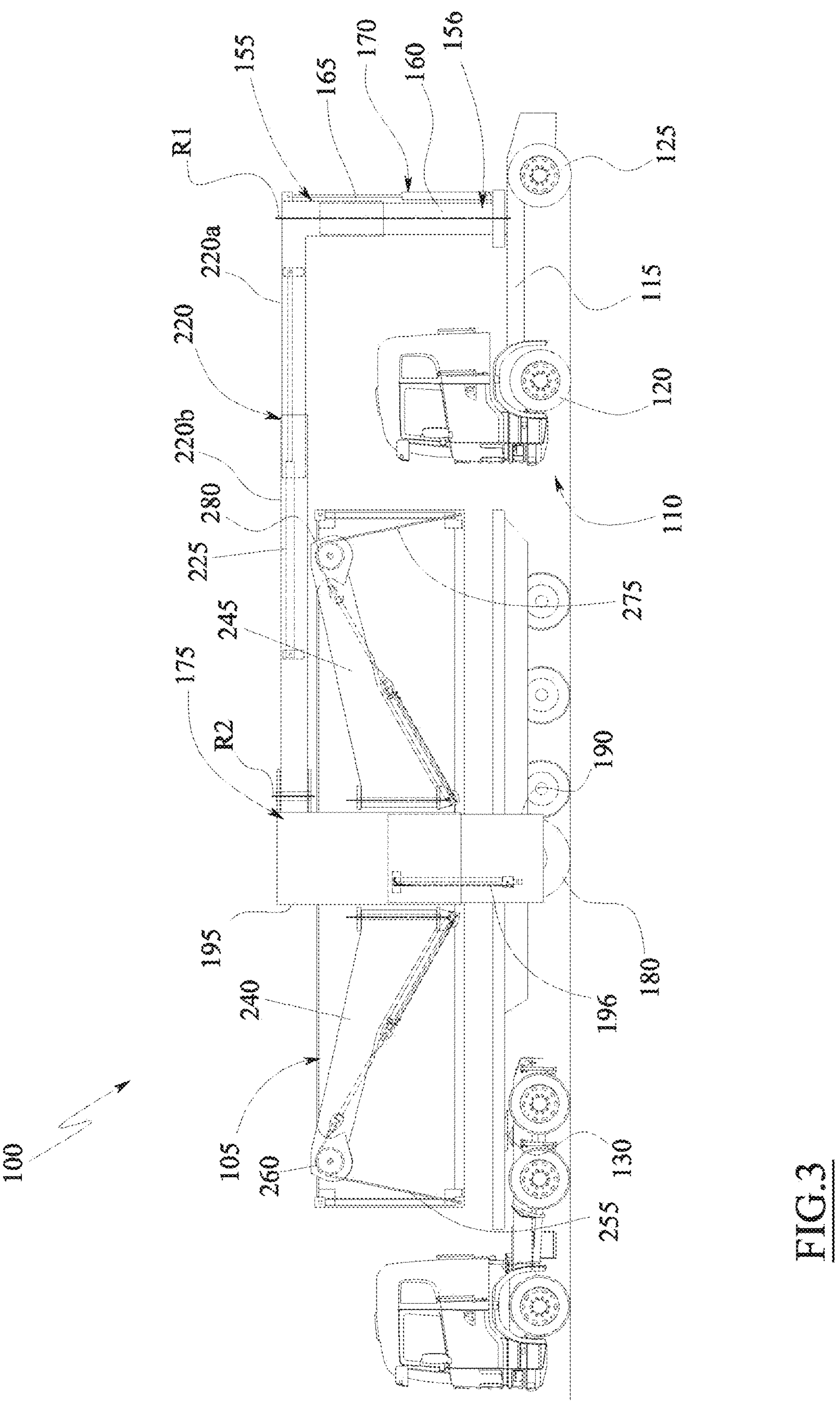
FIG. 3 is a schematic side view of the container handling system of the preceding figures, illustrated in a step of picking up or unloading a container with respect to the carriage of an articulated truck.

While the apparatus 101 keeps the container lifted, the tractor moves the apparatus 101 to the place where the container is to be unloaded, i.e., lowered. For example, thanks to the first telescopic column, the first crosspiece can be placed at a higher height than a portion of the top of the tractor, so that the tractor can be oriented such that the second and the third column, and hence the lifting arrangement, are in front of the cockpit (as illustrated in FIG. 3).

Once the apparatus 101 has completed its work, it can be brought back from the transport configuration to store it on the working place or take it to another place (working or storage).

In the case of the illustrated apparatus 101, the first step is to remove the spacer bars, after which, or if the apparatus 101 is not the illustrated apparatus, the drive of the connection arrangement is operated to move it from the first position to the second position.

If the columns and the first crosspiece are telescopic like in the case illustrated, they are also brought to their position of minimum longitudinal extension.

Figure 6:
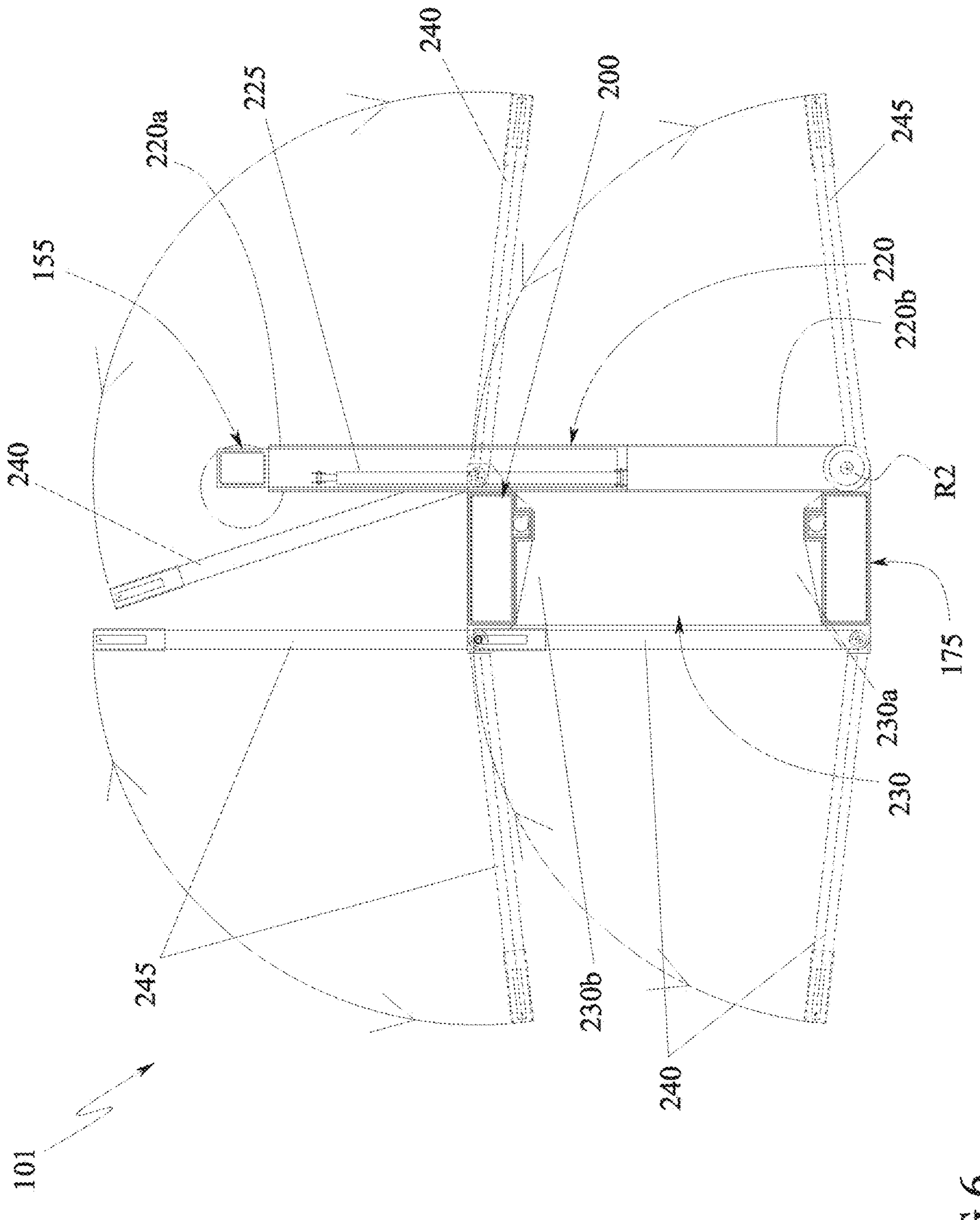
FIG. 6 is a schematic plan view illustrating a step in the passage of the apparatus from an operating configuration to a transport configuration.
Figure 7:
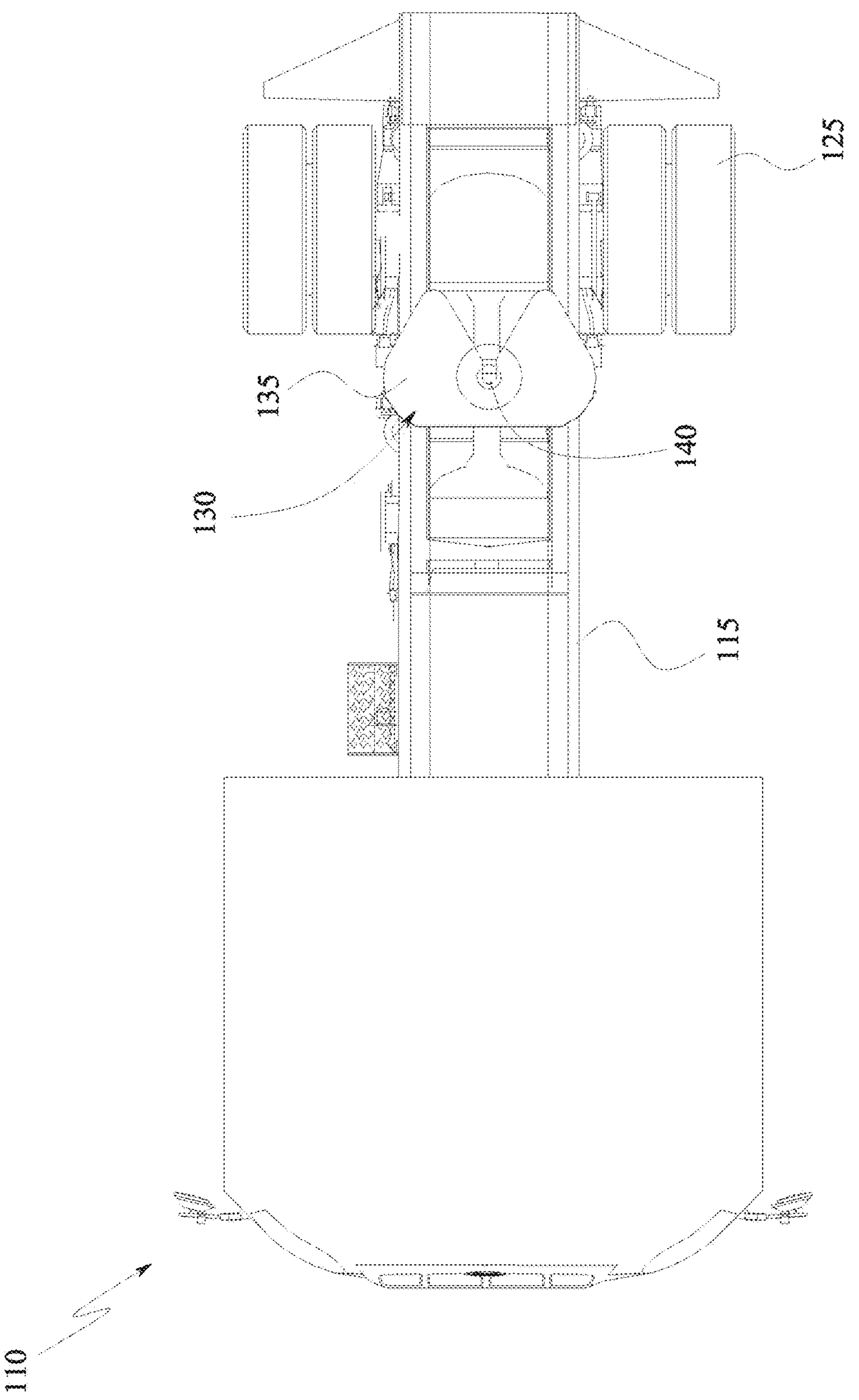
FIG. 7 is a schematic plan view of a tractor of the system of the preceding figures.

The arms shall be rotated with respect to the respective hinge axes as illustrated in FIG. 6, i.e., so that they are aligned two by two (thus within the single pair of arms) with respect to a direction transverse to a direction running from the second column to the first column when the connection arrangement is in the second position.

Since in this configuration the arms are free to move, it is advisable to fasten them to the rest of the variable footprint frame by means of ropes.

The invention thus conceived is susceptible to several modifications and variations, all falling within the scope of the inventive concept.

Moreover, all details can be replaced by other technically equivalent elements.

In practice, the materials used, as well as the contingent shapes and sizes, can be whatever according to the requirements without for this reason departing from the scope of protection of the following claims.

The invention claimed is:

1. A variable footprint handling apparatus for handling containers comprising:

- a first column adapted to be associated with the fifth wheel of a tractor,
- a second column to which a first idle ground support wheel is idly associated,
- a third column to which a second idle ground support wheel is idly associated,
- a lifting arrangement for lifting the container,
- a connection arrangement that connects the second column and the third column to the first column and is configured to move at least one of the three columns with respect to another of the three columns between a first position, and a second position, wherein a footprint in plan of the apparatus in said second position is smaller than a footprint in plan of the apparatus in said first position,
- wherein the connection arrangement is configured to move the third column between a first position,
- wherein the distance of the third column from the first column is maximum, and a second position, and
- wherein the distance between the third column and the first column is minimum, and the third column is at a distance from the first column that is less than the distance of the second column from the first column.

2. The apparatus according to claim 1, wherein the connection arrangement comprises:

- a first crosspiece provided with a first end rigidly fixed to the first column and a second end to which the second column is hinged with respect to a vertical axis of rotation,
- a second crosspiece provided with a first en rigidly fixed to the second column and a second end rigidly fixed to the third column,
- an actuator configured to move the third column in rotation with respect to said vertical rotation axis.

3. The apparatus according to claim 2, wherein the actuator is a linear actuator provided with a first end hinged to the first crosspiece and an opposite second end hinged to the second crosspiece.

4. The apparatus according to claim 1, wherein the third column and the second column are of the telescopic type.

5. The apparatus according to claim 2, wherein the first column and the first crosspiece are of the telescopic type.

6. The apparatus according to claim 1, wherein the lifting arrangement is provided with a first portion connected to the second column and a second portion connected to the third column.

7. The apparatus according to claim 6, wherein both the first portion and the second portion of the lifting arrangement each comprise:

- a pair of arms, of which a first arm and a second arm are hinged to the respective column with respect to a corresponding vertical hinge axis and which develop along respective longitudinal directions transverse to the corresponding hinge axis, a first container gripping body integral with a first rope at least partially wrapped around a first wheel hinged to the first arm and operated by means of a first actuator, a second container gripping body integral with a second rope at least partially wrapped around a second wheel hinged to the second arm and operated by means of a second actuator.

8. The apparatus according to claim 7, comprising a first spacer bar and a second spacer bar removably associable with respective arms facing each other, so as to prevent rotation of said arms with respect to the hinge axes.

9. The apparatus according to claim 1, comprising a pump driven by a motor and operatively connected to the connection arrangement for moving the first column between the first and the second position and wherein said pump and said motor are connected to at least one between the first, the second or the third column or to the connection arrangement.

10. A system for handling containers comprising a tractor, provided with a fifth wheel, and an apparatus according to claim 1, wherein the first column is removably connected to the fifth wheel of the tractor.

11. A variable footprint handling apparatus for handling containers comprising:

a first column adapted to be associated with the fifth wheel of a tractor, a second column to which a first idle ground support wheel is idly associated, a third column to which a second idle ground support wheel is idly associated, a lifting arrangement for lifting the container, a connection arrangement that connects the second column and the third column to the first column and is configured to move at least one of the three columns with respect to another of the three columns between a first position, and a second position, wherein a footprint in plan of the apparatus in said second position is smaller than a footprint in plan of the apparatus in said first position, wherein the connection arrangement comprises:

a first crosspiece provided with a first end rigidly fixed to the first column and a second end to which the second column is hinged with respect to a vertical axis of rotation, a second crosspiece provided with a first end rigidly fixed to the second column and a second end rigidly fixed to the third column, an actuator configured to move the third column in rotation with respect to said vertical rotation axis.

12. A variable footprint handling apparatus for handling containers comprising:

a first column adapted to be associated with the fifth wheel of a tractor, a second column to which a first idle ground support wheel is idly associated, a third column to which a second idle ground support wheel is idly associated, a lifting arrangement for lifting the container, a connection arrangement that connects the second column and the third column to the first column and is configured to move at least one of the three columns with respect to another of the three columns between a first position, and a second position, wherein a footprint in plan of the apparatus in said second position is smaller than a footprint in plan of the apparatus in said first position, wherein the lifting arrangement is provided with a first portion connected to the second column and a second portion connected to the third column, wherein both the first portion and the second portion of the lifting arrangement each comprise:

a pair of arms, of which a first arm and a second arm are hinged to the respective column with respect to a corresponding vertical hinge axis and which develop along respective longitudinal directions transverse to the corresponding hinge axis, a first container gripping body integral with a first rope at least partially wrapped around a first wheel hinged to the first arm and operated by means of a first actuator, a second container gripping body integral with a second rope at least partially wrapped around a second wheel hinged to the second arm and operated by means of a second actuator.

* * * * *